United States Patent [19]

Jarosch

[11] Patent Number: 5,187,944
[45] Date of Patent: Feb. 23, 1993

[54] VARIABLE SUPERHEAT TARGET STRATEGY FOR CONTROLLING AN ELECTRICALLY OPERATED REFRIGERANT EXPANSION VALVE

[75] Inventor: George W. Jarosch, Elk Grove, Ill.

[73] Assignee: Eaton Corporation, Cleveland, Ohio

[21] Appl. No.: 866,601

[22] Filed: Apr. 10, 1992

[51] Int. Cl.[5] .............................. F25B 41/00
[52] U.S. Cl. ........................ 62/225; 62/212
[58] Field of Search .................. 62/225, 224, 212

[56] References Cited

U.S. PATENT DOCUMENTS

| | | | |
|---|---|---|---|
| 4,523,435 | 6/1985 | Lord | 62/225 X |
| 4,617,804 | 10/1986 | Fukushima | 62/225 X |
| 4,646,532 | 3/1987 | Nose | 62/225 X |
| 4,845,956 | 7/1989 | Berntsen et al. | 62/212 X |

Primary Examiner—Harry B. Tanner
Attorney, Agent, or Firm—R. A. Johnston

[57] ABSTRACT

A method of controlling a refrigeration system employing an electronic controller for operating an electrically actuated refrigerant expansion valve supplying the evaporator or endothermic heat exchanger. The controller is of the type which modulates the valve for refrigerant flow to maintain a desired target level of superheated vapor discharging from the evaporator. When the compressor return, or evaporator discharge pressure ($P_c$) is within a preselected range the system employs a strategy to increment or decrement the target level of superheat depending upon whether the rate of change ($\Delta P_c$) of discharge pressure is positive or negative and thereby maximize pulldown by minimizing compressor cycling to achieve the superheat target.

3 Claims, 3 Drawing Sheets

VARIABLE SUPERHEAT TARGET STRATEGY FOR CONTROLLING AN ELECTRICALLY OPERATED REFRIGERANT EXPANSION VALVE

BACKGROUND OF THE INVENTION

The present invention relates to refrigeration systems and particularly refrigeration systems employed for air conditioning or climate control of the passenger compartment of an automotive vehicle. Automotive air conditioning systems typically employ an evaporator with a flow of blower air discharged over the evaporator into the passenger compartment for cooling. Refrigerant flow to the evaporator is through an expansion device or valve and is typically controlled by cycling an electric clutch for engaging the drive to the compressor.

Various expansion means such as capillary tubes or expansion valves may be employed to supply the refrigerant to the evaporator at a reduced pressure from the condenser. One type of expansion means comprises an electrically operated expansion valve typically having a solenoid controlled by an electronic controller utilizing a micro-computer for either proportional movement or modulated pulse movement. Examples of automotive air conditioning systems controlled by electrically operated expansion valves are shown and described in U.S. Pat. No. 4,790,145, 4,835,976, 4,848,100, and 4,873,836.

In such systems where an electrically operated expansion valve is employed for controlling refrigerant flow to the evaporator, it is known to sense the evaporator discharge or suction return pressure and to provide an electrical signal indicative thereof to an electronic controller for generating a control for controlling the amount of opening of the expansion valve. In systems of this latter type, when the thermal load on the evaporator is high, e.g., when the interior of the vehicle is very hot, it is desirable to run the evaporator as cold as possible to effect a maximum rate of cool down for the passenger compartment. Under such conditions, it is desired to maintain the compressor energized or operable on an uninterrupted basis so long as there is no likelihood of condensate freezing and ice formation on the exterior of the evaporator. Under conditions of high thermal load, it is undesirable to cycle the compressor "OFF" because of the attendant rise in blower discharge air over the evaporator which reduces the rate of cooling of the passenger compartment interior.

However, if the compressor is allowed to run continuously and the evaporator is maintained as cold as possible under conditions of moderate thermal loading, ice may form on the evaporator fins blocking off air flow, resulting in evaporator freeze-up. Thus, the compressor clutch must be cycled "OFF" before freeze-up occurs.

In air conditioning systems employing electrically operated expansion valves, a target or desired minimum amount of superheat is chosen for the refrigerant vapor discharging from the evaporator. Heretofore, the superheat target has been a fixed value and an internal parameter of the programming of the microcomputer in the valve controller. Raising the superheat target tends to make controller respond to cause the valve to run more closed, allowing less refrigerant flow to the evaporator, which raises the superheat. This also has the general effect of reducing the suction pressure, which helps speed pressure reduction during a pulldown, but also tends to lead to premature clutch cycling occurrences in a pulldown, and more frequent clutch cycles during steady state conditions. Clutch cycling during a pulldown is undesirable because the rise in discharge air temperature, which occurs while the compressor is off, slows the progress of the pulldown.

Reducing the superheat target tends to make the controller respond to run the valve more open, increasing the refrigerant flow, which lowers the evaporator superheat. This results in the suction pressure running higher; and, in general, reduces the likelihood of the clutch cycling.

SUMMARY OF THE INVENTION

The present invention provides an electronic controller employing a microcomputer which is programmed to change the superheat target setting to vary within a preselected range, preferably 3 to 9° Centigrade. The superheat target is varied independently of the separate algorithm for normal generation of a control signal for controlling operation of the electrically operated refrigerant expansion valve. The controller of the present invention uses a higher superheat target when the suction pressure is "high" and a lower superheat target when the suction pressure is "low". Where the suction pressure is "high", that is, well above the compressor clutch turnoff point, but below the pressure limit point. The "low" suction pressure is chosen as a pressure level within a few PSI of the compressor clutch turnoff point.

The control system of the present invention is operative when the clutch first energizes to set the superheat target at 9° Centigrade to rapidly bring the suction pressure down. As the suction pressure drops to within 2 PSI above the compressor clutch cutoff point, the superheat target is reduced to 3° Centigrade at a rate which is dependent on the rate of the suction pressure drop.

The variable superheat target algorithm changes the target setting based only on the suction pressure. The Proportional term serves to increase the superheat target when the pressure is well above the compressor clutch cutoff point. An integral term is used to slowly increase the superheat target setting when the suction pressure is only slightly above the clutch cutoff point; and, is operative to slowly decrease the superheat target setting when the suction pressure is just below the compressor clutch cutoff point. A differential term will either decrease or increase the superheat target setting, dependent upon the direction of the change, $\Delta P$, in suction pressure. When the change is positive, i.e., suction pressure is rising, the setting is increased to help bring the suction pressure back down. When the change in suction pressure is negative, i.e., the pressure is dropping, the setting is decreased to avoid lowering the pressure drop to the compressor clutch cutoff point. The superheat target algorithm is satisfied when the pressure stays at the compressor clutch cutoff level and no changes are made in the superheat target setting when this is the case.

DETAILED DESCRIPTION

Figure 1:
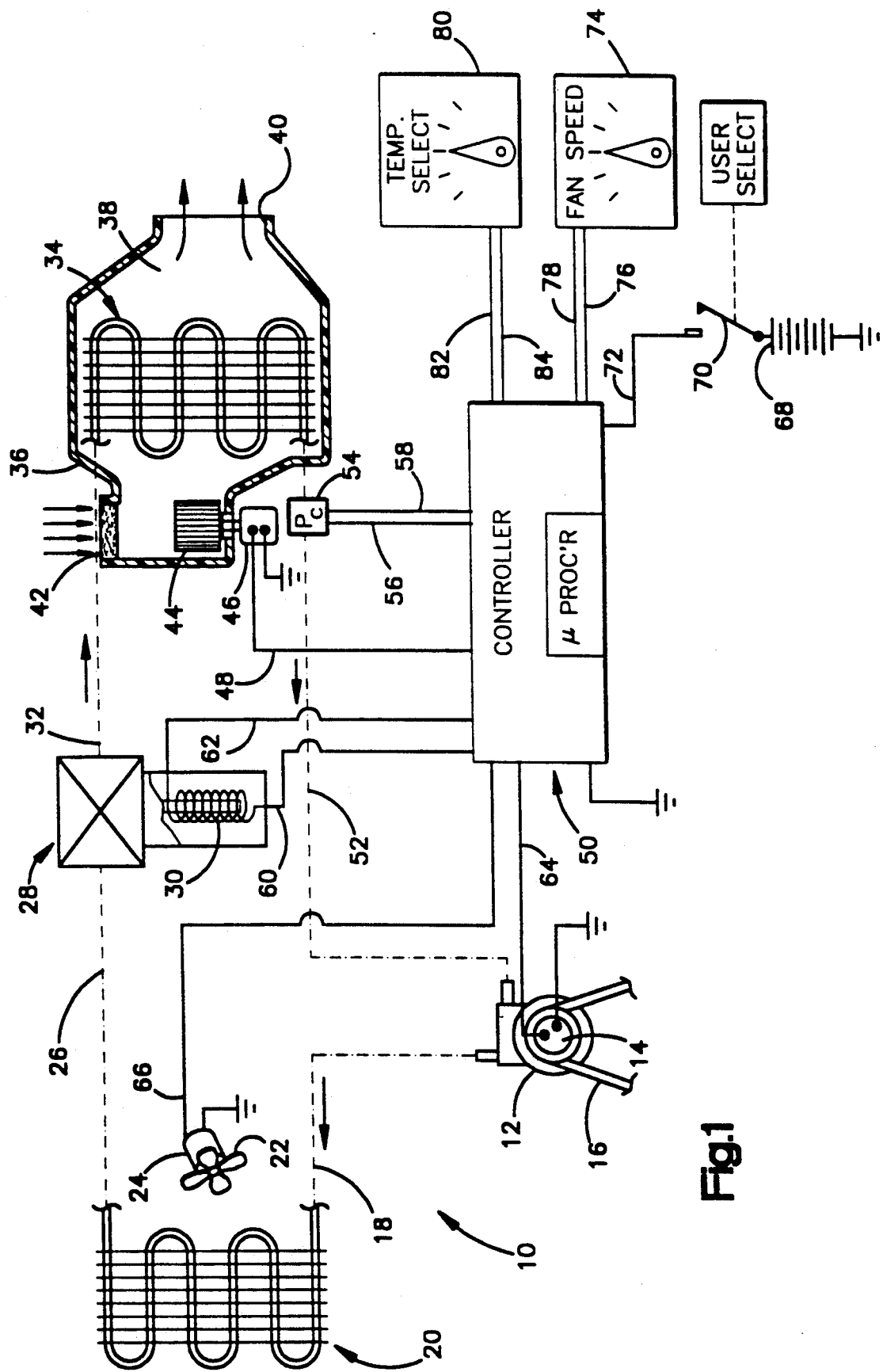
FIG. 1 is a schematic of the present invention as embodied in an automative air conditioning system; and, FIGS. 2A and 2B are a block flow diagram of the program for the controller of the system of FIG. 1.

Referring to FIG. 1, a refrigeration or air conditioning system is indicated generally at 10, and is illustrated as applied to automotive air conditioning having a compressor 12 connected to a source of power by an electrically operated clutch 14 driven by power transmission belt 16, which is typically connected to the engine crankshaft (not shown). Pressurized refrigerant from compressor 12 is discharged at relatively high pressure through conduit 18 to a condenser indicated generally at 20, which is typically cooled by ambient ram air as augmented at low speed by a fan 22 powered by a fan motor 24.

Condensed refrigerant from condenser 20 is discharged through conduit 26 to the inlet of an electrically operated expansion valve, indicated generally at 28, which is typically powered by a solenoid coil 30. The valve 28 discharges liquid refrigerant at a substantially reduced pressure along conduit 32 to the inlet of an evaporator indicated generally at 34.

The evaporator is disposed in a blower housing 36 which has a plenum chamber 38 which discharges air through outlet 40 to the passenger compartment of a vehicle. The blower housing has a filtered air inlet 42 and a blower 44 disposed therein.

Blower 44 is typically shaft-connected through the wall of blower housing 36 to a blower motor 46, which receives power along lead 48 from a controller, indicated generally at 50, with the opposite side of the motor grounded to the common vehicle ground.

The evaporator discharges superheated refrigerant along conduit 52, which is connected to the suction return or inlet of compressor 12. A pressure sensing switch 54 is disposed in the conduit 52 and senses the suction return pressure Switch 54 is connected via leads 56,58 to the controller 50.

Expansion valve 28 has the solenoid coil 30 thereof connected via leads 60,62 to receive a control signal, such as a pulse width modulated signal for a fractional duty cycle "ON" time, from the controller 50. The controller also provides power to the compressor clutch 14 along lead 64, with the other side of the clutch coil grounded. The controller also provides power to condenser fan motor 24 along lead 66 with the other side of motor 24 grounded. The controller is powered from the vehicle battery supply 68 by User Select switch 70 through power lead 72.

The evaporator blower fan motor 46 is controlled by user operated Fan Speed control 74 which is connected to the controller along lead 76,78. If desired, however, control 74 may operate fan 74 directly. A user Temperature Select control 80 so provides an input to the controller along leads 82,84.

The Temperature Select control is utilized, as is known in the art, to provide a user input to the system for obtaining the desired temperature of the passenger compartment.

Figure 2A:
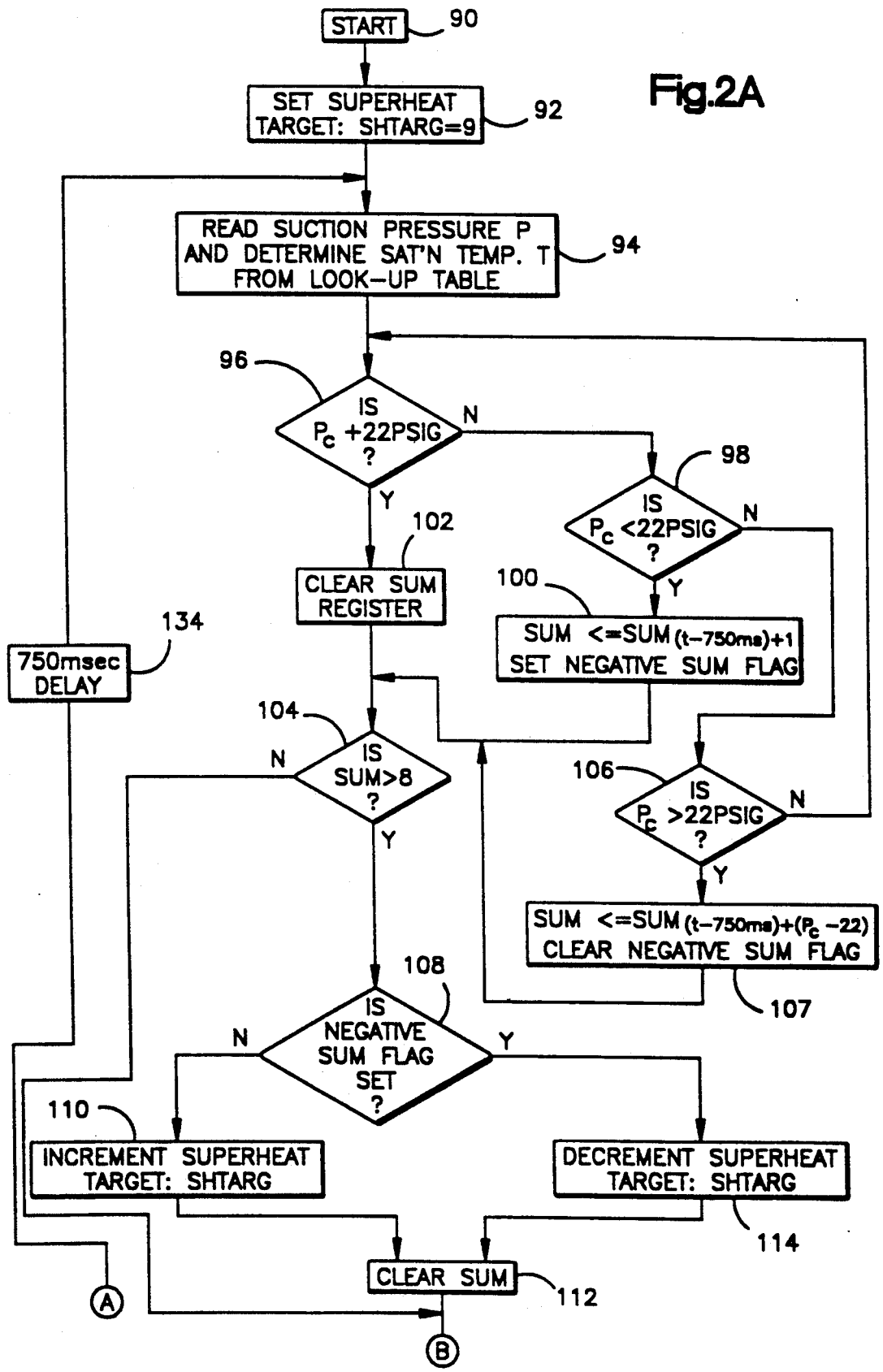
Figure 2B:
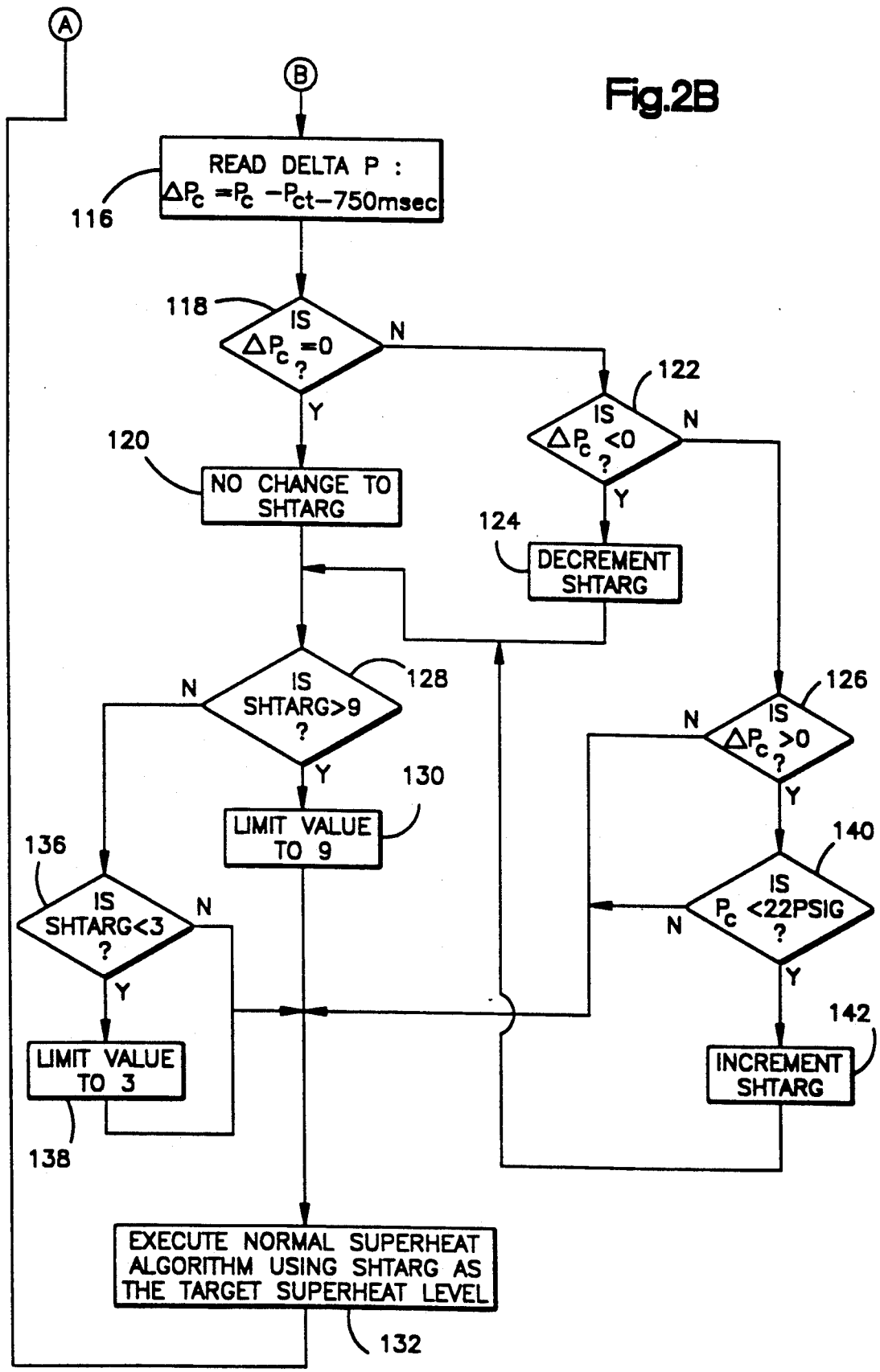

Referring to FIGS. 2A and 2B, the control strategy for implementing the present invention in a refrigeration control system such as that shown in FIG. 1 is illustrated the block flow diagram. The system is initiated or started at step 90 and the superheat target SHTARG is set equal to 9° Centigrade at step 92. The system controller then proceeds to read the suction pressure $P_c$ at step 94 and determines the saturation temperature $T_s$ from a look-up table for the measured value of $P_c$.

The system controller then proceeds to step 96 and makes the determination as to whether $P_c$ is equal to 22 PSIG (151.8 KPa). If the determination at step 96 is a negative, the system proceeds to step 98 and further makes the determination whether $P_c$ is less than 22 PSIG; and, if this is the case, proceeds to step 100. At step 100 the SUM at time t is computed as the SUM at time t−750 milliseconds incremented by the integer 1 and the NEGATIVE SUM flag is set.

If, however, the determination at step 96 is affirmative, the SUM register is cleared at step 102. The system proceeds from step 100 to step 104 to determine whether the value of the SUM is greater than 8.

If, however, the determination at step 98 is negative, the system proceeds to step 106 to make the determination whether the value of $P_c$ is greater than 22 PSIG. If the determination at step 106 is in the negative, the system returns to step 96. However, if the determination of the suction pressure at step 106 is affirmative, the system Proceeds to step 107 and computes the value of the SUM as the value at t−750 milliseconds incremented by the difference between the suction pressure and the base value 22 PSIG; and, the NEGATIVE SUM flag is cleared and the system proceeds to step 104.

If the determination at step 104 is affirmative, the system proceeds to step 108 and makes the determination as to whether the NEGATIVE SUM flag is set.

If the determination at step 108 is negative, the controller proceeds to step 110 and increments the superheat target SHTARG and then proceeds to clear SUM at step 112. If, however, the determination at step 108 is affirmative, the system proceeds to step 114 and decrements the superheat target SHTARG.

The system proceeds from step 112 to step 116 to read the value of the pressure change $\Delta P_c$ as the value of $P_c$ at time t−the value of $P_c$ at time t−750 milliseconds.

If the determination at step 104 is in the negative, the system proceeds to step 116.

The system proceeds from step 116 after reading $\Delta P_c$ to step 118 and makes the determination as to whether $\Delta P_c$ is equal to 0; and, if this is the case, proceeds to step 120 with no change to SHTARG.

If, however, the determination at step 118 is negative, the system proceeds to step 122 to make the determination as to whether $\Delta P_c$ is less than 0.

If the determination at step 122 is affirmative, the system proceeds to step 124 to decrement SHTARG. However, if the determination at step 122 is in the negative, the system proceeds to step 126 to make the determination as to whether $\Delta P_c$ is greater than 0.

From step 120 the system proceeds to step 128 to ask the question whether SHTARG is greater than 9° Centigrade; and, if the answer is affirmative, the system proceeds to 30 step 130 and limits the value of SHTARG to 9° Centigrade. The system then proceeds to step 132 and executes the system normal control algorithm using SHTARG as the target superheat level, and after a 750 millisecond delay at step 134 returns to step 94.

If, however, the determination at step 128 is that SHTARG is not greater than 9° Centigrade, the system proceeds to step 136 and makes the determination whether SHTARG is less than 3° Centigrade and if this is the case, limits the value to 3° Centigrade and returns to step 132. If the determination at step 136 is negative, the system proceeds directly to step 132.

If the determination at step 126 is that $\Delta P_c$ is not greater than 0, the system proceeds directly to step 132. If, however, the determination at step 126 is affirmative, the system proceeds to step 140 and makes the determination whether the suction pressure $P_c$ is less than 22 PSIG; and, if this is the case, the system proceeds to step 142 and increments SHTARG and then returns to step 128. If the determination at step 140 is in the negative, the system proceeds directly to step 132.

The present invention thus provides a control strategy for incrementing or decrementing the superheat target for controlling the electrically operated expansion valve to vary the superheat target depending upon the level and rate of change of the suction pressure. The control strategy of the present invention thus permits maximum compressor run at high thermal loading to minimize compressor clutch cycling and thereby optimize the pull-down of the evaporator temperature for rapid cooling. The control strategy of the present invention accommodates lighter thermal loading on the evaporator by initially setting a higher superheat target and allowing the system to respond by normal clutch cycling.

Although the invention has hereinabove been described with respect to the illustrated embodiment, it will be understood that the invention is capable of modification and variation and is limited only by the following claims.

I CLAIM:

1. A method of controlling refrigerant flow in a refrigeration system of the type having an energizable pump for circulating refrigerant through a condenser, an expansion valve, an evaporator and for return to the pump, said method comprising:
    (a) energizing said pump;
    (b) measuring the pressure $P_c$ of the refrigerant returning to said pump;
    (c) determining from a look-up table for said refrigerant the saturation temperature $T_s$ for said measured $P_c$;
    (d) summing the difference between said values of $P_c$ and a reference pressure and incrementing said sum with a constant when said measured $P_c$ is less than a predetermined value;
    (e) summing the difference between said measured values of $P_c$ and a reference pressure and incrementing said sum with the amount by which $P_c$ exceeds said predetermined value when $P_c$ is greater than said predetermined value;
    (f) incrementing said superheat target when said sum exceeds a predetermined limit and said sum is incremented with a constant;
    (g) decrementing said superheat target when said sum exceeds said limit and said sum is not incremented with a constant;
    (h) measuring the rate of change of $P_c$ and decrementing said superheat target when said rate of charge is negative and incrementing said superheat when said rate of change is positive and $P_c$ is less than a predetermined value; and,
    (i) generating a control signal in accordance with a predetermined algorithm as a function of a refrigerant vapor superheat and electrically controlling said expansion valve with said signal to achieve a target value of superheat.

2. The method defined in claim 1, wherein said incremented value of said superheat target is limited to 9.

3. The method defined in claim 1, wherein said decremented value of said superheat target is not less than 3.

* * * * *